United States Patent
Seal et al.

(10) Patent No.: US 7,968,072 B2
(45) Date of Patent: *Jun. 28, 2011

(54) IN-SITU SYNTHESIS OF CARBON NANOTUBES FILLED WITH METALLIC NANOPARTICLES USING ARC DISCHARGE IN SOLUTION

(75) Inventors: Sudipta Seal, Oviedo, FL (US); Debasis Bera, Gainesville, FL (US); Suresh C. Kuiry, Campbell, CA (US); Meyya Meyyappan, Pacifica, CA (US); Matthew Luke McCutchen, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 277 days.

This patent is subject to a terminal disclaimer.

(21) Appl. No.: 12/229,683

(22) Filed: Aug. 26, 2008

(65) Prior Publication Data

US 2009/0072192 A1    Mar. 19, 2009

Related U.S. Application Data

(62) Division of application No. 10/891,570, filed on Jul. 15, 2004, now Pat. No. 7,438,885.

(60) Provisional application No. 60/487,711, filed on Jul. 16, 2003.

(51) Int. Cl.
*B82B 3/00* (2006.01)
(52) U.S. Cl. .................................................. 423/447.1
(58) Field of Classification Search ............... 423/447.1; 977/846
See application file for complete search history.

(56) References Cited

U.S. PATENT DOCUMENTS

| 6,855,231 | B2 | 2/2005 | Kajiura et al. ........... 204/157.15 |
| 7,438,885 | B1 * | 10/2008 | Seal et al. .................. 423/447.1 |

OTHER PUBLICATIONS

Lago et al., 'Filling Carbon Nanotubes with Small Palladium Metal Crystallites: the Effect of Surface Acid Groups' in J. Chem. Soc., Chem. Commun. 1995 pp. 1355-1356 (no month).*
"In-site synthesis of palladium nanoparticles-filled carbon nanotubes using arc-discharge in solution," Debasis Bera et. al, Elsevier, 2004, pp. 364-368.
Graham, Thomas, "On the Absorption and Dialytic Separation of Gases by Colloid Septa" Philisophical Magazine, Dec. (1866) pp. 501-531, vol. 32, No. 218.
Saha M.N., "Ionization in the Solar Chromosphere" Philisophical Magazine, (1920) pp. 472-489, vol. 40.
Krustinsons, et al., "Uber Die Thermische Einiger Chloride" Ztschr. Elektrochem. (1938) pp. 537-539, vol. 44, No. 8.
Franklin, R.E. "Proceedings of the Royal Society of London" Proceedings of the Royal Society of London, (1951) pp. 196-218, vol. 31, No. 1097.
Bacon, R. "Growth, Structure, and Properties of Graphite Whiskers" J. of Appl. Physics, (1960) pp. 283-290, vol. 31, No. 2.
Bell, W.E. "The Palladium-Chlorine System at High Tempatures" J. Phys. Chem. (1961) pp. 510-517, vol. 65.
Hartley, F.R. "The Chemistry of Platinum and Palladium" Applied Science Publisher, London (1973) pp. 230-233.
Salomons, E. "On the Lattice Gas Description of Hydrogen in Palladium a Molecular Dynamics Study" J. Phys. Condens.: Matter. (1990) pp. 845-855.
Lijima, S. "Helical Microtubules of Graphitic Carbon" Letters to Nature (1991) pp. 56-58, vol. 354.
Moulder, et al. "Handbook of X-Ray Photoelectron Spectroscopy" Perkin-Elmer Corp. (1992) p. 234.
Ebbesen T. W., et al. "Large-Scale Synthesis of Carbon Nanotubes" Letter to Nature (1992) pp. 220-222, vol. 358.
Lijima, S. "Pentagons, Heptagons and Negative Currvature in Graphite Microtubule Growth" Letters to Natue (1992) pp. 776-778, vol. 356.
Sawada, S. et al., "Energetics of Carbon Nanotubes" Solid State Commun. (1992) pp. 917-919, vol. 83.
Tsang, S.C. et al., "Thinning and Opening of Carbon Nanotubes by Oxidation Using Carbon Dioxide" Letters to Nature (1993) pp. 520-525, vol. 362.
Ajayan, P.M. et al., "Capillarity-Induced Filling of Carbon Nano-Tubes" Nature, (1993) pp. 333-334, vol. 361.
Seraphin, S., et al., Yttium Carbide in Nanotube Nature (1993) p. 503, vol. 362.
Dravid, et al. "Buckytubes and Derivatives: Their Growth and Implications for Buckyball Formation" Science, (1993) p. 1601-1604, vol. 259.
Planeix, J.M. et al., "Application of Carbon Nanotubes as Supports in Heterogeneous Catalysis" J. Am. Chem. Soc. (1994) pp. 7935-7936, vol. 116.

(Continued)

Primary Examiner — Stuart Hendrickson
(74) Attorney, Agent, or Firm — Brian S. Steinberger; Joyce P. Morlin; Law Offices of Brian S. Steinberger, P.A.

(57) ABSTRACT

A novel method for simultaneously forming and filling and decorating carbon nanotubes with palladium nanoparticles is disclosed. Synthesis involves preparing a palladium chloride ($PdCl_2$) solution in a container, having two graphite electrodes, then immersing the graphite electrode assembly, into the $PdCl_2$ solution; connecting the graphite electrodes to a direct current power supply; bringing the electrodes into contact with each other to strike an arc; separating the electrodes to sustain the arc inside the solution; putting the container with electrode assembly in a water-cooled bath; and collecting Pd-nanoparticles encapsulated in carbon nanotubes and carbon nanotubes decorated with Pd-nanoparticles. The temperature at the site of the arc-discharge is greater than 3000° C. At these temperatures, the palladium is ionized into nanoparticles and the graphite electrodes generate layers of graphene (carbon), which roll away from the anode and encapsulate or entrap the Pd-nanoparticles. The unique nanotube structures have significant commercial potential as gas sensors or as a means for hydrogen storage.

3 Claims, 16 Drawing Sheets

OTHER PUBLICATIONS

Guerret Piecourt, C., et al. "Relation Between Metal Electronic Structure and Morphology of Metal Compounds Inside Carbon Nanotubes" Nature, (1994) pp. 761-765, vol. 372.

Ajayan, et al. "Growth of Manganese Filled Carbon Nanofibers in the Vapor Phase" Phys. Rev. Lett., (1994) pp. 1722-1725, vol. 72.

Barr, T.L. et al. "Nature of the Use of Adventilious Carbon as a Binding Energy Standard" J. Vacuum Sci. Technol. (1995) pp. 1239-1246, vol. A13.

Dillon, A.C. et al. "Storage of Hydrogen in Single-Walled Carbon Nanotubes" Nature, (1997) pp. 377-379, Vo. 379.

Collins, et al. "Nanotube Naodevice" Science (1997) pp. 100-103, vol. 278.

Tans, et al. "Room Temperature Transistor Based on a Single Carbon Nanotube" Nature (1998) pp. 49-52, vol. 393.

Mickelson, E.T. et al. "Fluorination of Single-Wall Carbon Nanotubes" Chem. Phys. Lett. (1998) pp. 188-194, vol. 296.

Gao, Y. et al. Appl. "Dense Arrays of Well-alligned Carbon Nanotubes Completely Filled with Single Crystalline Titanium Carbide Wires on Titanium Substrates" Phys. Lett. (1999) pp. 3642-3644, vol. 74.

Ang, et al. "Electroless Plating of Metals onto Carbon Nanotubes Activated by Single-Step Activation Method" Chem. Matter (1999) pp. 2115-2118, vol. 11.

Che, G. et al. "Metal-Nanocluster-Filled Nanotubes: Catalytic Properties and Possible Applications in Electrochemical Energy Storage and Production" Langmuir (1999) pp. 750-758, vol. 15.

Chen, et al. High H2 Uptake by Akali-Doped Carbon Nanotubes Under Ambient Pressure Temperatures, Science (1999) pp. 91-93, vol. 285.

Ishigami, M. et al. "A simple Method for the Continuous Production of Carbon Nanotubes" Chem. Phys Lett. (2000) pp. 457-459, vol. 319.

Yang, R.T., et al. "Hydrogen Storage by Alkali-doped Carbon Nanotubes-Revisited" Carbon. (2000) pp. 623-626, vol. 38.

Dresselhouse, M.S. et al. "Carbon Nanotubes: Synthesis Structure Properties and Application" Springer Verlag, Berlin (2000) pp. 404-407.

Luo, J.Z. et al. "The Decomposition of NO on CNT's and 1 wt%Rh/CNT's" Catalysis Letters. (2000) pp. 91-97, vol. 66.

Pinkerton, F.E., et al. "Thermogravimetric Measurement of Hydrogen Absorption in Alkali-Materials" J. Phys. Chem. B (2000) pp. 9460-9467, vol. 104.

Lee, S.M. et al. "Hydrogen Absorption and Storage in Carbon Nanotubes" Syn, Metals, (2000) p. 209, vol. 113.

Kong, et al. "Nanotube Molecular Wire as Chemical Sensors" Science (2000) pp. 622-625, vol. 287.

Lordi' L.P. et al. "Method for Supporting Platinum on Single-Walled Carbon Nanotubes for a Selective Hydrogenation Catalyst" Chem. Mater (2001) pp. 733-737, vol. 13.

Hsin, et al. "Productionand In-situ Metal Filling of Carbon Nanotubes in Water" Adv. Mater (2001) pp. 830-833, vol. 13.

Sano N., et al. "Synthesis of Carbon Onions in Water" Nature (2001) p. 506, vol. 414.

Ahu, H.W. et al. "Formation of Carbon Nanotubes in Water by the Electric-arc Technique" Chem. Phys. Lett. (2002) pp. 664-669, vol. 366.

Liu, et al. "Preparation and Characterization of Platinum-Based Electrocatalysts on Multiwalled Carbon Nanotubes for Proton Exchange Membrane Fuel Cells" Langmuir (2002) pp. 4054-4060 vol. 18.

Yasuda, A, et al. "Graphitization Mechanism during the Carbon-Nanotube Formation Based on the In-Situ HRTEM Observation" J. Phys. Chem. B. (2002) pp. 1849-1852, vol. 106.

Qikun, W. et al."Hydrogen Storage by Carbon Nanotube and their Films Under Ambient Pressure" Int. J. Hyd. Energy (2002) pp. 497-500, vol. 27.

Sano, N. et al. "Properties of Carbon onions Produced by and Arc Discharge in Water" J. App. Phys. (2002) pp. 2783-2788, vol. 91.

Heinze, S. et al. "Carbon Nanotubes as Schottky Barrier Transistors" Phys. Rev. Lett. (2002) pp. 106801-106801-4, vol. 89.

Appenzeller, J. et al."Field-Modulated Carrier Transport in Carbon Nanotube Transistors" Phys. Rev. Lett. (2002) pp. 126801-126804, vol. 89.

Shimoda, H. et al. "Lithium Intercalation into Opened Single-Wall Carbon Nanotubes: Storage Capacity and Electronic Properties" Phys. Rev. Lett. (2002) pp. 015502-1-4, vol. 88.

Oku, T., et al. "Calculationof H2 Gas Storage for Boron Nitride and Carbon Nanotubes Studied form the Cluster Calculation" Physica B. (2002) pp. 216-218, vol. 323.

Cinke, M. et al. "Pore Structure of Raw and Purified HiPco Single-wallled Carbon Nanotubes" Chem. Phy. Lett (2002) pp. 69-74, vol. 365.

Bera, D. et al. "Palladium Nanoparticle Arrays Using Template-Assisted Electrodeposition" Appl. Phys. Letts. (2003) pp. 3089-3091, vol. 82.

Zhang, G.Y. "Cu-filled Carbon Nanotubes by Simultaneous Plasma-Assisted Copper Incorporation" Appl. Phys. Lett (2003) pp. 1926-1928, vol. 82.

Serp, P. et al. "Carbon Nanotubes and naofiber in Catalysis" Applied Catalysis A: General (2003) pp. 337-359, vol. 253.

Dong, X., et al. "Highly Active CNT-promoted Cu-ZnO-A1203 Catalyst for Methanol Synthesis from H2/CO/CO2" Catalysis Letters (2003) pp. 237-245, vol. 85.

Ye, X.R. et al. "Chemical Communication, Decorating Catalytic Palladium Nanoparticles on Carbon Nanotubes in Supercritical Carbon Dioxide" (2003) pp. 642-643, vol. 5.

Peng, S. et al. "Ab Initio Study of Doped Carbon Nanotube Sensors" Nano Lett., (2003) pp. 513-517, vol. 3.

Biro, L.P. et al. "Continuous Carbon Nanotube production in Underwater AC Electric Arc" Chem. Phys. Lett. (2003) pp. 399-402, vol. 372.

Javey, A. et al. "Ballistic Carbon Nanotube Field-effect Transistors" Letter to Nature, (2003) pp. 654-657, vol. 424.

Zhang, G. et al. "Tubular Graphite Cones" Science (2003) pp. 472-474, vol. 300.

Bera, D, et al. "In-situ Synthesis of Palladium Nanoparticles-filled Carbon Nanotubes using Arc-discharge in Solution" Chem. Phys. Letts. (2004) pp. 364-368, vol. 386.

Bera, D., et al. "Kinetics and Growth Mechanism of Electrodeposited Palladium Nanocrystallites" J. Phys. Chem. B (2004) pp. 556-562, vol. 108.

* cited by examiner

Figure 1a
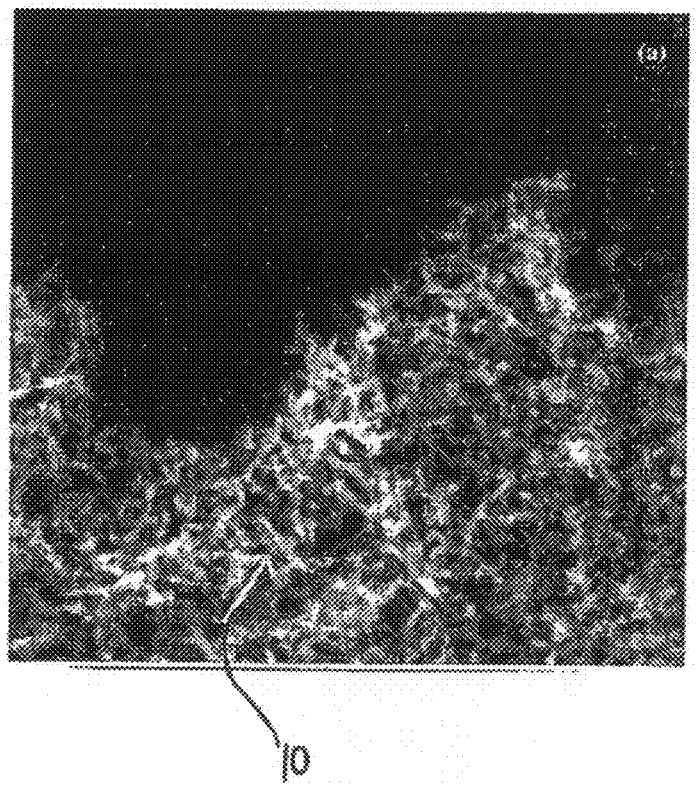
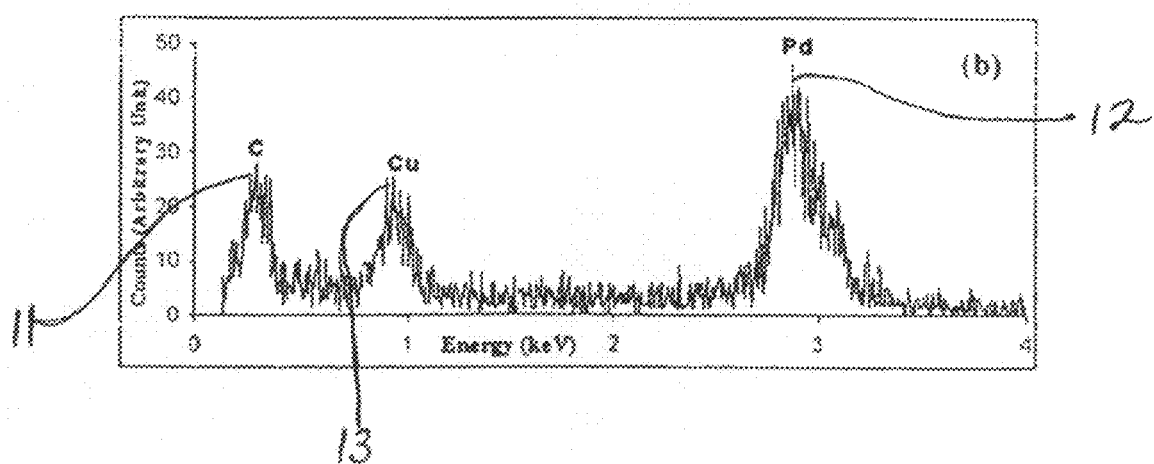
Figure 1b

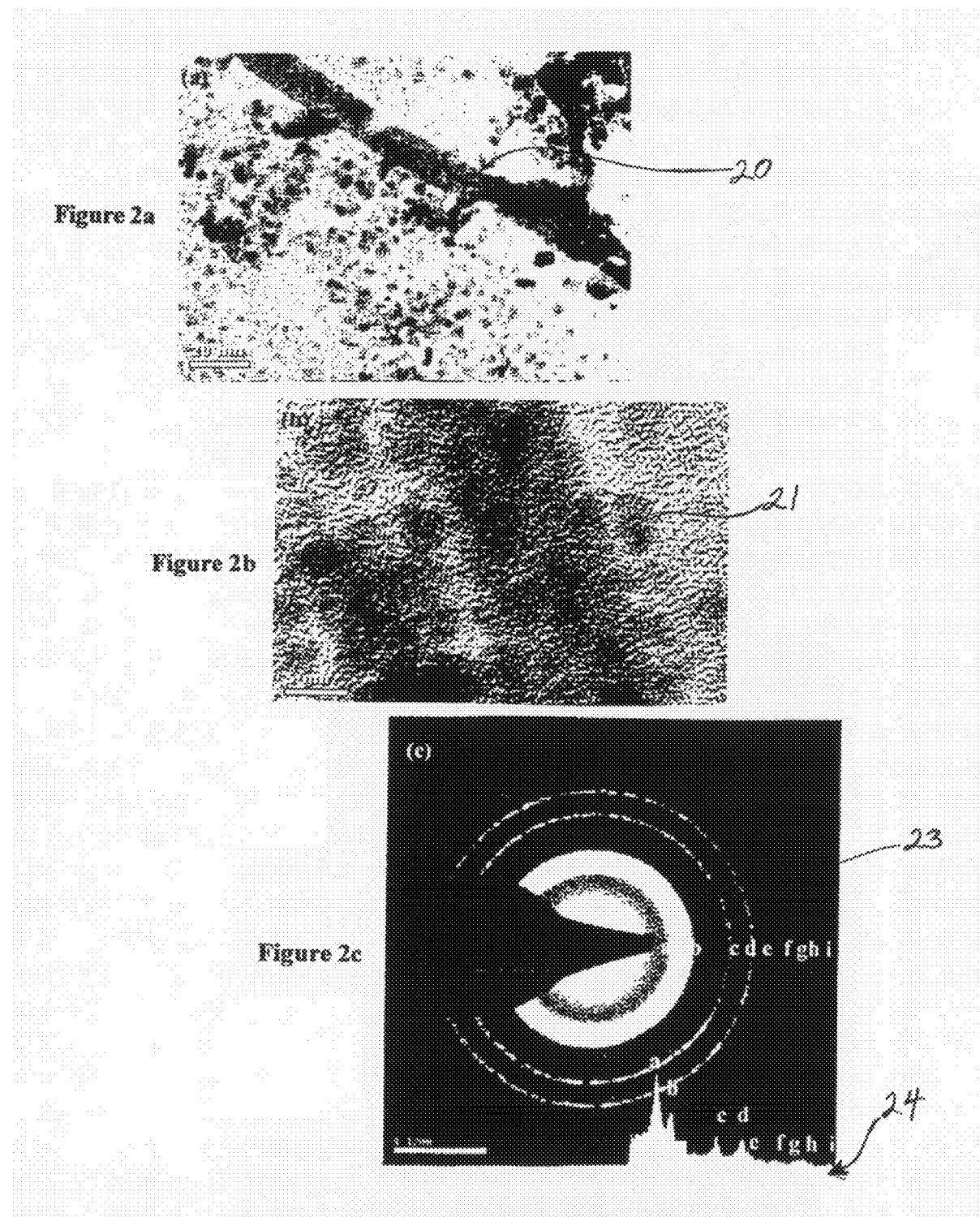

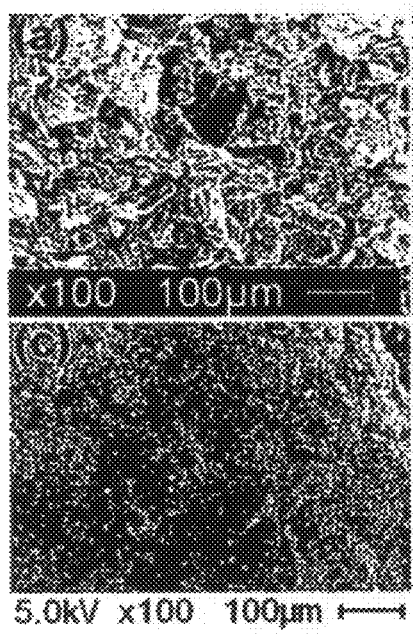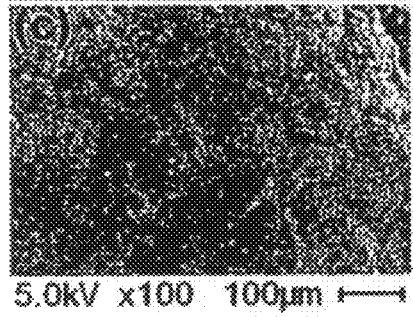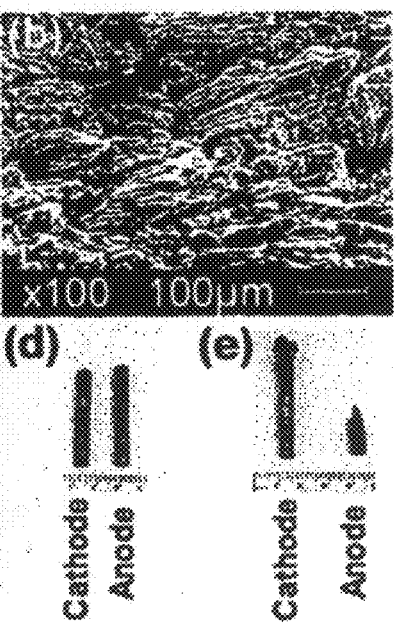
Figure 7

IN-SITU SYNTHESIS OF CARBON NANOTUBES FILLED WITH METALLIC NANOPARTICLES USING ARC DISCHARGE IN SOLUTION

This invention is a divisional of U.S. patent application Ser. No. 10/891,570 filed Jul. 15, 2004; now U.S. Pat. No. 7,438, 885, which claims the benefit of priority to U.S. Provisional Patent Application Ser. No. 60/487,711 filed Jul. 16, 2003.

FIELD OF THE INVENTION

This invention relates to the synthesis of carbon nanotubes containing metals, in particular to novel carbon nanotubes filled with palladium nanoparticles and a method of manufacture.

BACKGROUND AND PRIOR ART

Carbon nanotubes are strong tubular structures formed from a single or multi-layer of carbon atoms measured in billionths of a meter (nanometer) in diameter. Carbon nanotubes are proclaimed to be stronger than diamonds and more expensive than gold with significant technological potential. Potential applications can include flat panel display in telecommunications devices, fuel cells, lithium-ion batteries, high-strength composites, novel molecular electronics, gas sensors, and a means for hydrogen storage.

Recent developments include filling the hollow cavity of the tiny, thread-like carbon nanotubes to control or influence nanotube behavior and functionality. The bulk of nanotube production is still a challenge because it is very expensive—more than gold.

Undeterred by costs, researchers have developed several methods for filling nanotubes with metal oxides, pure metals and other materials. The nature of the filling is dependent on the method used to introduce the materials to the nanotube cavity with some methods giving discrete crystalline filling and molten media giving long, continuous crystals. One disadvantage of prior art methods of filling nanotubes is that the crystals and the long continuous fibers have a limited surface area, thus limiting the functional capacity for various applications.

Carbon nanotubes (CNTs) are usually filled using postprocessing steps which involve opening up and filling through either capillary action or other chemical means. Such additional filling steps are not only inefficient, but also additive to the overall production cost. Thus, the search for new, interesting, affordable filled-carbon nanotubes continues.

The synthesis of metal-filled carbon nanotubes has tremendous potential for technological applications, such as, in gas sensing, catalyst supports and hydrogen storage wherein large surface areas are required. Thus, the palladium nanoparticle-filled carbon nanotubes and method of manufacture of the present invention have significant commercial potential.

SUMMARY OF THE INVENTION

The first objective of the present invention is to provide an inexpensive, one-step method for making filled-nanotubes that simultaneously fills and decorates the nanotubes during its synthesis.

The second objective of the present invention is to provide a simplified arc-discharge in solution method for the synthesis of carbon nanotubes filled with palladium nanoparticles.

The third objective of the present invention is to produce palladium nanoparticles with a diameter of approximately 3 nanometers (nm) inside carbon nanotubes.

The fourth objective of the present invention is to produce carbon nanotubes with diameters of approximately 15 nm in each nanotube.

The fifth objective of the present invention is to simultaneously form and encapsulate palladium nanoparticles in the hollow cavity of carbon nanotubes.

The sixth objective of the present invention is to provide carbon nanotubes filled and decorated with palladium nanoparticles that have an enhanced ability for hydrogen storage.

The sixth objective of this invention is to provide carbon nanotubes filled and decorated with palladium nanoparticles that function as gas sensors.

The seventh objective of this invention is to provide carbon nanotubes filled and decorated with other metal nanoparticles and their compounds consisting of oxides, sulfides, carbides, nitrides, halides, and the like, for various other applications.

Filling the carbon nanotubes with metallic nanoparticles, especially palladium, is to enhance the hydrogen storage ability of carbon nanotubes (CNTs). The CNTs filled and decorated with palladium nanoparticles have been characterized using high-resolution transmission electron microscopy (HRTEM) equipped with energy dispersive spectroscopy (EDS) system, transmission electron microscopy (TEM), scanning electron microscopy (SEM) and X-ray photoelectron spectroscopy (XPS) for size, morphology, chemical constituent and chemical state.

Further objects and advantages of this invention will be apparent from the following detailed description of a presently preferred embodiment that is illustrated schematically in the accompanying drawings.

BRIEF DESCRIPTION OF THE FIGURES

FIG. 1A shows a scanning transmission electron microscopy (STEM) image of a large number of Pd-filled carbon nanotubes.

FIG. 1B shows the energy dispersive spectroscopy (EDS) spectrum confirming the presence of carbon and palladium in the nanotubes.

FIG. 2A shows a high-resolution transmission electron microscopy (HRTEM) image of a CNT filled with palladium (Pd) nanoparticles.

FIG. 2B shows lattice fringes of Pd nanoparticles in the size of approximately 3 nm under high resolution.

FIG. 2C shows a selected area diffraction pattern (SAED) pattern of Pd-nanoparticles inside the CNT showing various lattice planes.

FIG. 7a is a scanning electron micrograph (SEM) of a graphite rod before the in-situ synthesis of palladium filled and decorated carbon nanotubes (CNTs).

FIG. 7b is a scanning electron micrograph (SEM) of the anode, ten minutes after the arc-discharge.

FIG. 7c is a scanning electron micrograph (SEM) of the cathode, ten minutes after the arc-discharge.

FIG. 7d shows images of graphite rods before the in-situ synthesis of palladium filled and decorated CNTs.

FIG. 7e shows images of graphite rods after the in-situ synthesis of palladium filled and decorated CNTs.

FIG. 9a is an enlarged inset micrograph that reveals the distance between two concentric walls.

DESCRIPTION OF THE PREFERRED EMBODIMENT

Figure 3:
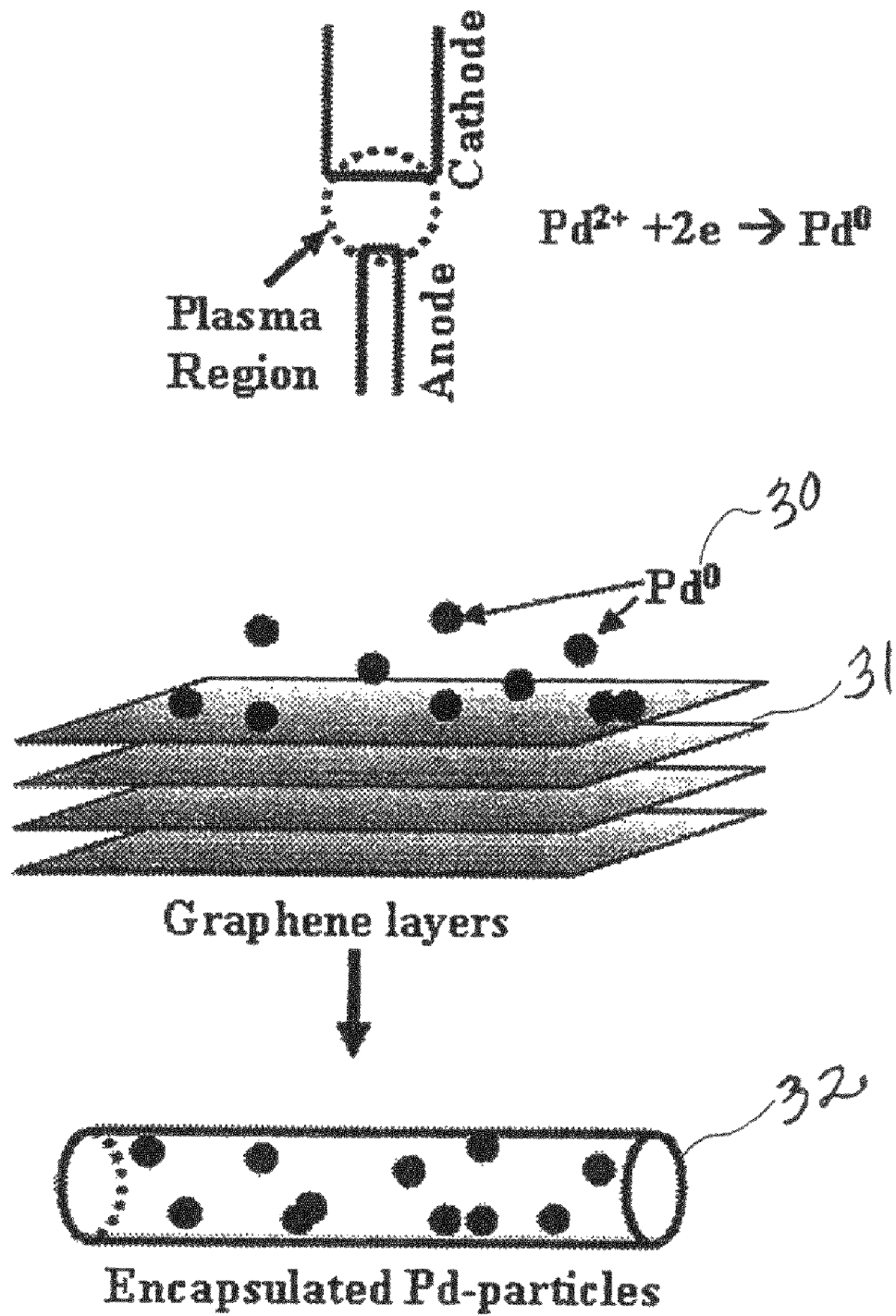
FIG. 3 is a schematic diagram showing the formation of the CNT filled with Pd-nanoparticles in the arc-discharge in solution method.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Carbon nanotubes (CNTs) are classified into two types; a single hexagonal mesh tube called a single-walled carbon nanotube abbreviated as ("SWCNT") and another comprising a tube of a plurality of layers of hexagonal meshes called a multiwalled carbon nanotube (abbreviated as "MWCNT").

The synthesis and product of the present invention is appropriate for both SWCNT and MWCNT.

Reference is made to "encapsulating" and "decorating" CNTs; both words are used to describe the filling of a CNT with nano-sized particles. "Encapsulating" provides a minimum number of nano-sized particles to the interior cavity of a CNT. "Decorating" is used to mean impregnating the inner and outer walls of the CNT and thereby incorporating a maximum number of nano-sized particles in a CNT. The impregnating of the inner and outer walls of the CNT occurs during the simultaneous formation of the CNT and the entrapment of the nano-sized particles during the arc discharge in solution.

FIG. 1A shows a scanning transmission electron microscopy (STEM) image of the SWCNT. The STEM micrograph reveals the presence of a large numbers of Pd-filled, carbon nanotubes, and one such nanotube is indicated by an arrow 10 in FIG. 1A.

FIG. 1B is an energy dispersive spectroscopy (EDS) spectrum that confirms the presence of carbon 11 and palladium (Pd) 12 in the nanotubes. A copper (Cu) grid is used in the TEM study, hence a Cu peak 13 was also present in the EDS spectrum. The EDS spectrum did not reveal the presence of chlorine, which indicates that the palladium ions in the solution were reduced to metallic palladium during the arc discharge in solution synthesis.

An HRTEM image 20 of a CNT filled with Pd-nanoparticles is depicted in FIG. 2A. The carbon nanotube shown in FIG. 2A has a diameter of about 15 nm. FIG. 2A also indicates the presence of dark regions inside the nanotube. Further investigation with the high-resolution mode on those regions shows the lattice fringes 21 of palladium nanoparticles in the size of about 3 nm, as presented in FIG. 2B. Thus, FIG. 2B further confirms that the presence of a Pd peak in the EDS spectrum in FIG. 1B was due to these nanoparticles inside the CNT. In order to investigate the crystal structure of these encapsulated Pd-particles, selected area diffraction pattern 23 (SAED) was collected in the TEM and is depicted in FIG. 2C. The intensity profile 24 of the SAED pattern is presented as an inset at the bottom right corner of FIG. 2C, which clearly indicates the presence of nine different diffraction peaks corresponding to nine diffraction rings in the SAED. After indexing the diffraction pattern, it is confirmed that the crystal structure of these Pd-nanoparticles are face-centered cubic. SAED pattern 23 of Pd-nanoparticles inside the CNT shows various lattice planes [a: 11; b: 200; c: 220; d: 311; e: 222; f: 400; g: 331; h: 420; i: 422].

Although the exact mechanism of the reduction of $PdCl_2$ into nanoparticles of Pd metal is not clear; the following possibilities are plausible explanations. Reduction of palladium ions into atomic palladium in the solution can take place with the help of reducing gases, such as, carbon monoxide and hydrogen, which are formed during the arc-discharge process in the solution. The temperature at the site of the arc is greater than 3000° C. Hence, the plasma region produced by the arc adjacent to the electrodes is enveloped by a solution-vapor interface. There is a substantial thermal gradient across the plasma region. The decomposition temperature of palladium chloride is 738° C. at ambient atmospheric pressure. Therefore, the palladium chloride is possibly thermally decomposed to atomic Pd and chlorine gas near the electrodes. Subsequently, chlorine atoms combined to form chlorine gas, which escaped with water vapor and carbon monoxide, which is the reason for not detecting chlorine in the EDS spectrum.

Another explanation is that palladium ions ($Pd^{2+}$) are reduced to Pd atoms taking electrons from the plasma formed due to the arc discharge, an excellent source of electrons.

Palladium nanoparticles having a diameter of 3 nm are formed after the arc discharge in $PdCl_2$ solution.

The formation of CNTs in the present invention is accomplished by a known method. Graphite anode consists of two-dimensional hexagonal arrays of carbon atoms which are known as graphene. Such graphene or graphitic carbon sheets are rolled from the anode, thereby forming graphitic carbon tubules, at high temperatures, during the arc discharge in the solution. Therefore, palladium nanoparticles 30 simultaneously formed, are trapped and encapsulated in the carbon nanotubes during rolling of graphitic layer 31 from the graphite anode. A schematic diagram of simultaneous formation and encapsulation of Pd nanoparticles in CNTs 32 is shown in FIG. 3.

Figure 4:
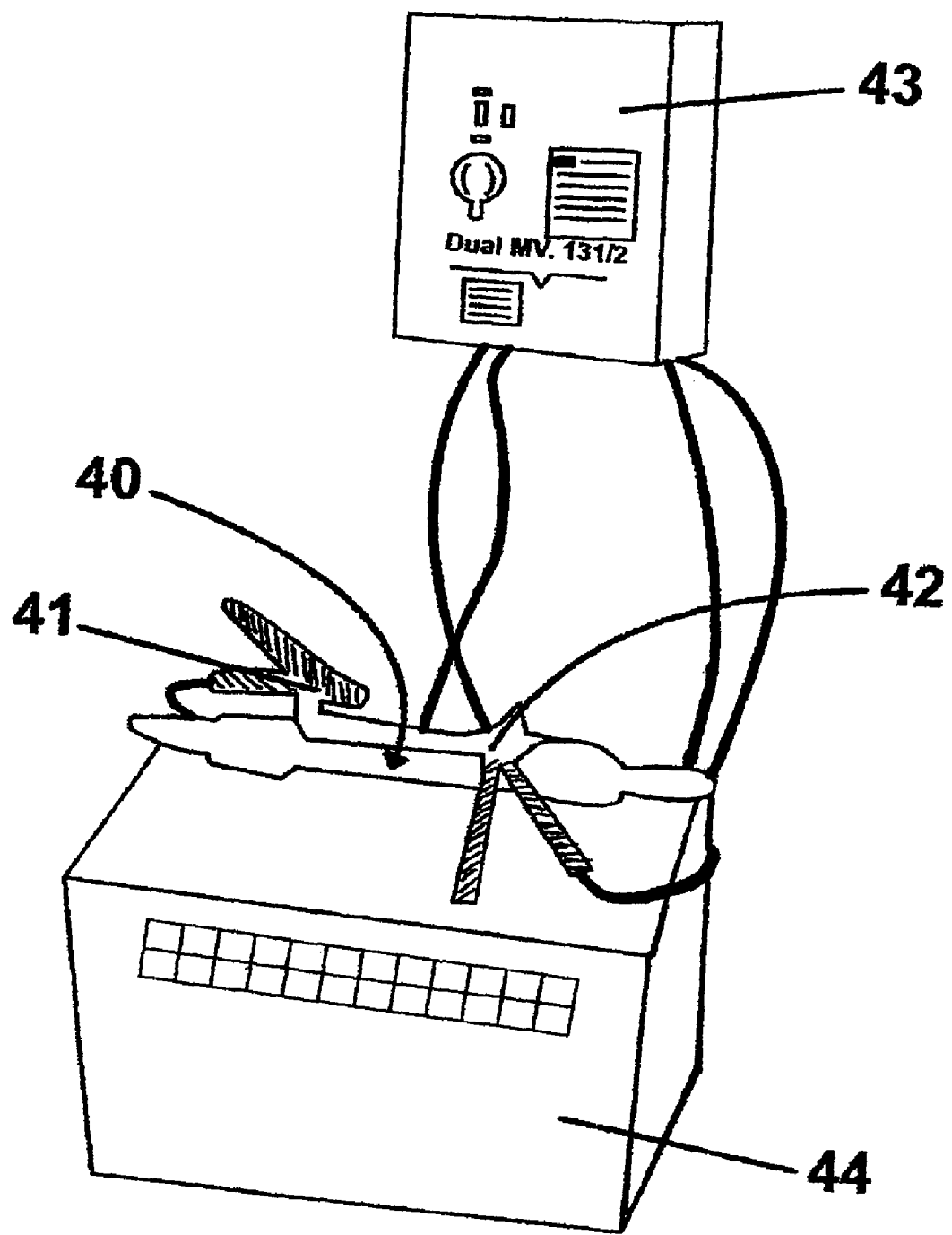
FIG. 4 is a diagram of a complete experimental set-up for making nanoparticle filled CNTs using arc-discharge in solution.

FIG. 4 is a diagram of a complete experimental set up for making nanoparticle-filled carbon nanotubes. The reaction chamber or container 40 is fitted with two graphite electrodes 41, 42. Electrode 41 functions as a cathode and electrode 42 functions as an anode. A direct current power source 43 is connected to the anode and cathode to supply power for the arc-discharge. Conveniently positioned near the reaction chamber 40 is the chiller 44, which contains a water-cooled bath having a temperature of approximately 7° C. The set-up in FIG. 4 can be used to synthesize a wide variety of carbon nanotubes filled with metal nanoparticles. The carbon nanotubes can be single-walled or multi-walled. Below is an example of the preparation of palladium-filled carbon nanotubes; however, it should be understood that a wide variety of metallic-filled carbon nanotubes can be produced using the process disclosed herein.

Example

A palladium chloride solution of 2 milli molar (mM) concentration is prepared by dissolving $PdCl_2$ powder with 99.999% purity in de-ionized water. In order to ensure complete dissolution of the palladium chloride, hydrochloric acid is added to have its concentration 0.1 molar (M) in the solution. Palladium chloride and hydrochloric acid are obtained from Sigma-Aldrich Chemical Company. The resistance of the de-ionized water used in the present invention is greater than 10 MΩ. Synthesis of CNTs filled with Pd-nanoparticles is carried out in a reactor containing the palladium chloride solution. Two graphite electrodes, acting as a cathode and an anode, are immersed in the reactor containing the 2 mM $PdCl_2$ solution. The diameters of the graphite rods used for cathode and anode are 3.05 mm and 12.70 mm, respectively. The anode and cathode materials are obtained from Alfa Aesar with 99.9995% and 99.0% purity, respectively. A direct current power supply (Model: DUAL MIG 131/2) manufactured by Chicago Electric, is connected to the graphite electrodes, which are immersed in the palladium chloride solution. The electrodes are brought in contact with each other to strike an arc and then are separated immediately to a distance of approximately 1 mm in order to sustain the arc inside the solution for a certain period of time. Graphene sheets from the anode are detached and roll away at high temperatures during arc-discharge in solution. The reactor with electrode assembly is put inside a water-cooled bath, having a temperature of approximately 7° C., in order to avoid the excessive heating of the $PdCl_2$ solution. Palladium nanoparticles encapsulated within or attached to carbon nanotubes are synthesized from palladium chloride solution through the arc discharge method at an open circuit potential of 28 V with an optimized direct current of 35 amperes (A). Palladium metal filled carbon nanotubes are collected and studied further using HRTEM (Model: Philips 300 TECNAI) at 300 kV for their size and the crystal structure.

Figure 5:
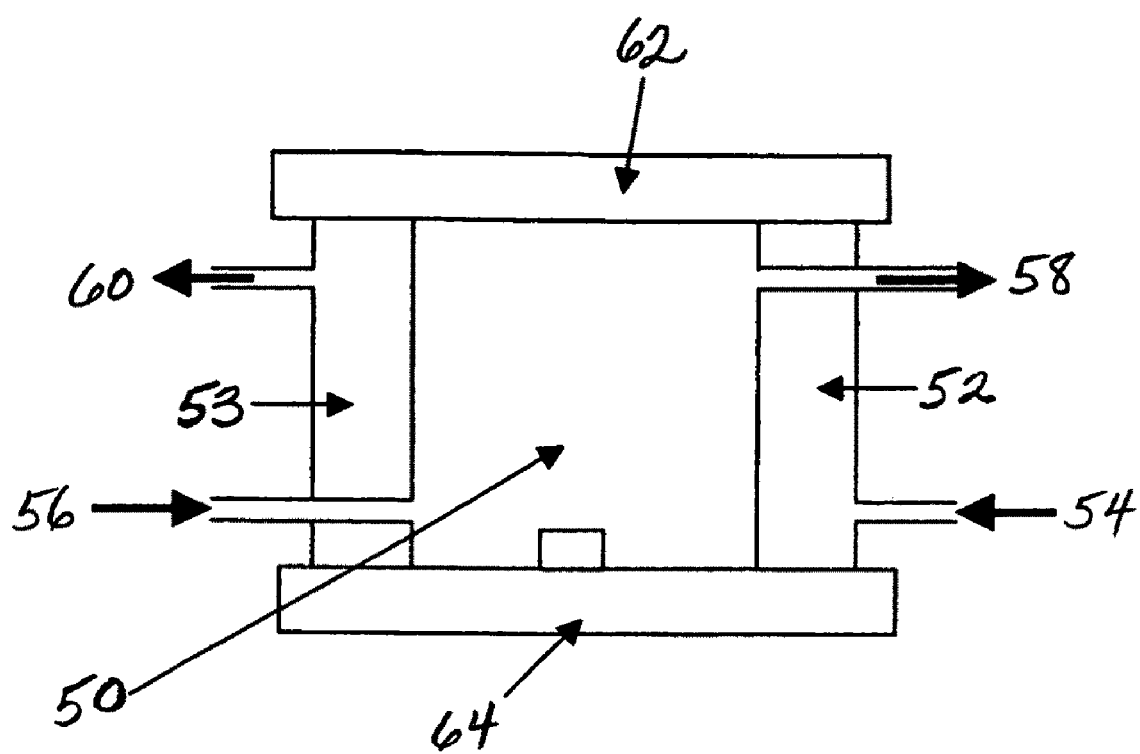
FIG. 5 is a schematic diagram of a reaction cell for arc-discharge in solution.

Another especially designed reactor cell shown in FIG. 5 was used for in-situ, one-step synthesis of CNTs decorated or filled with palladium (Pd) nanoparticles. The reactor cell has four main components; a cell cavity 50 a direct current (DC) power supply system (not shown), a filtering unit and a chilling loop. In FIG. 5, the schematic diagram shows a cell with a height of approximately 20 centimeters (cm) that consists of double walled glass 52, 53 with 2 cm thickness for flowing of cold water at 7° C. to facilitate cooling. The inner diameter of the cylindrical cell is 10 cm. The cell has two inlets 54, 56 and two outlets 58, 60. The inlet 54 is paired with outlet 60 that are both connected to the volume between the double glass walls 52, 53 for the flow of chilled water used to cool the cell. The other inlet 56 is paired with outlet 58 which are both connected directly to the interior of the cell. Inlet 56 is used for filling the cell with the solution for the arc-discharge reaction and filtering out through outlet 58, the encapsulated and decorated nanotubes from the cell. Two stainless steel plates 62, 64 are used to connect the anode and cathode electrodes.

Extensive analysis of the arc-discharge reaction, electrodes and reaction products are described in detail below.

Figure 6A:
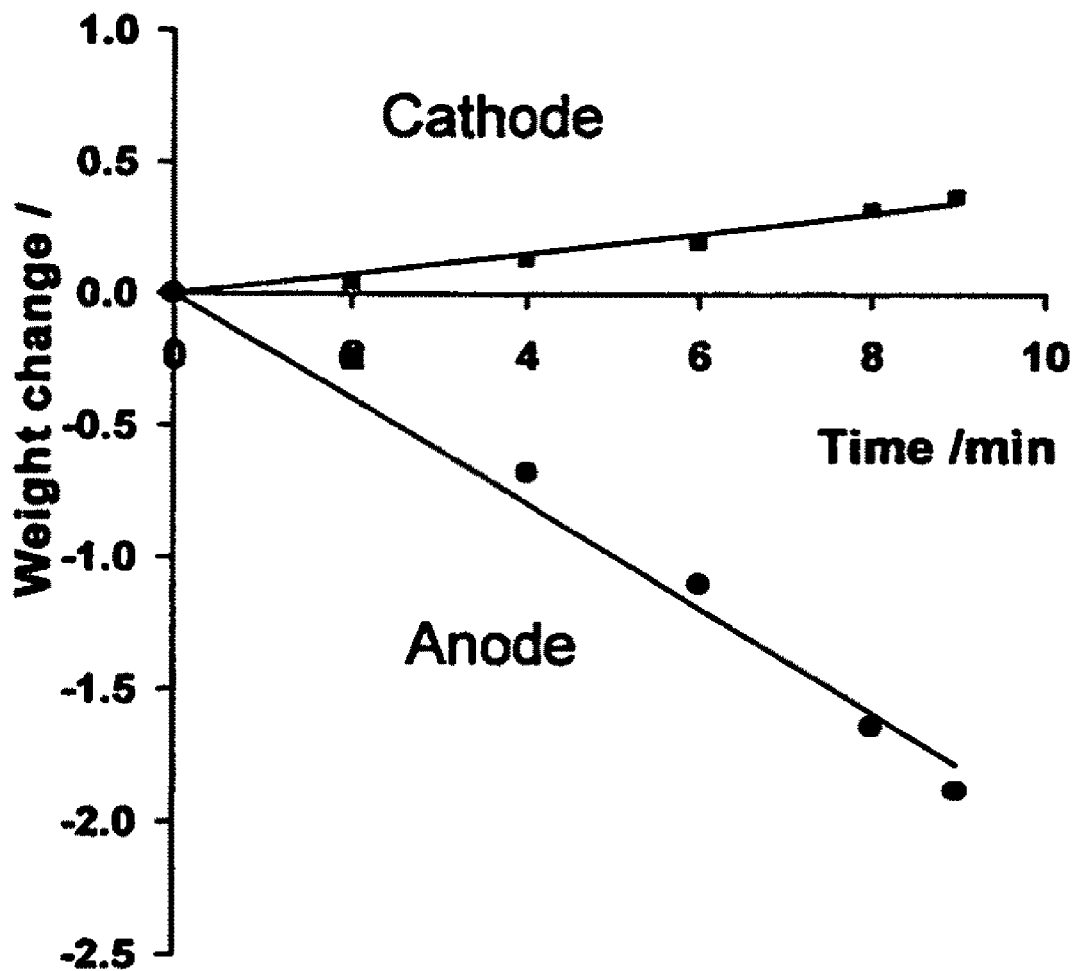
FIG. 6a is a graph of the weight change of cathode and anode electrodes with time during arc-discharge in solution.
Figure 6B:
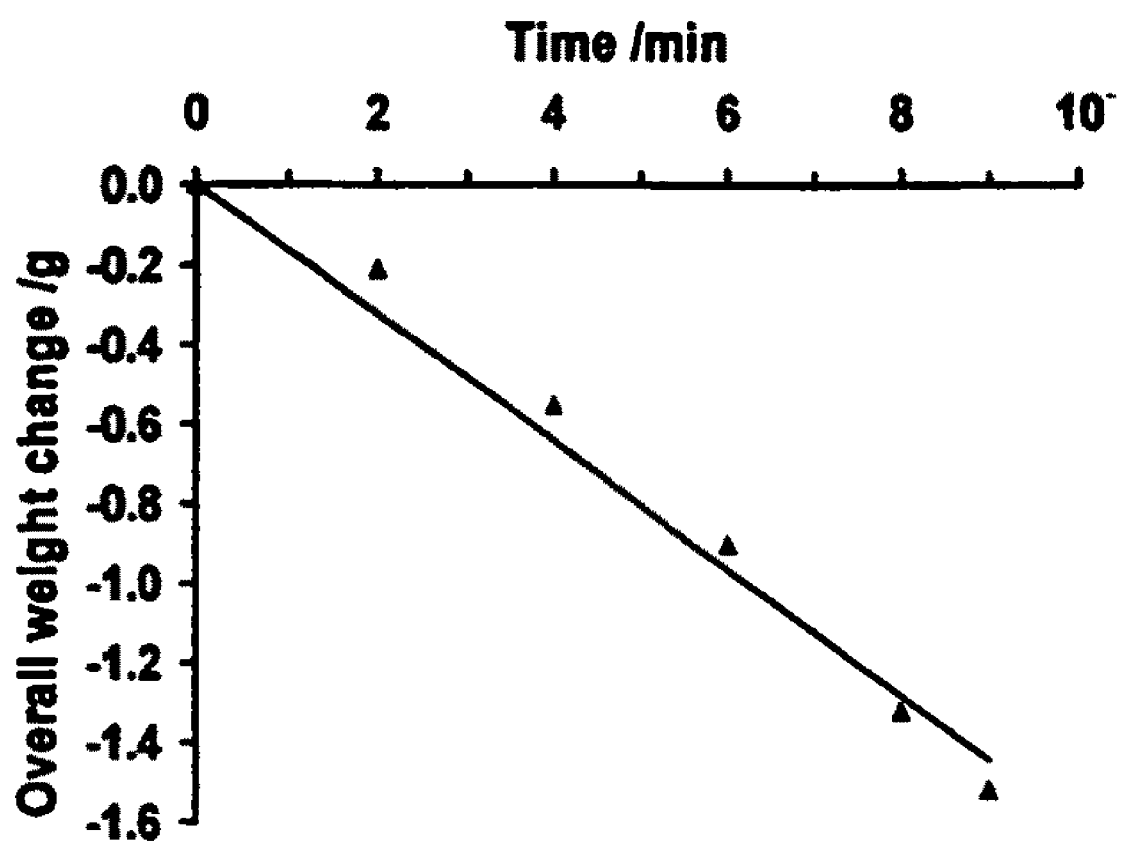
FIG. 6b is a graph of the combined weight change of anode and cathode electrodes with time during arc-discharge in solution.

FIG. 6a represents the weight change of each electrode at two-minute intervals. There was less than 0.5 gram weight increase in the weight of the cathode and up to 2.0 gram weight decrease in the weight of the anode during a ten minute interval. FIG. 6b represents the cumulative weight change of both the cathode and anode at two-minute intervals over a period of ten minutes. The graph clearly documents a decrease in cumulative weight of the electrodes. The cathode gains weight with time, whereas the anode loses weight with time during the arc discharge. The overall weight of the electrodes decreases with time.

A portion of the excessive heat produced in the solution during arcing causes evaporation of the solution. The evaporation rate of the water during arc-discharge in solution in the present invention was found to be 3.2 $cm^3 \cdot min^{-1}$. The temperature at the site of the region of the arc is expected to be greater than 3500° C. Hence, the plasma region produced by the arc adjacent to the electrodes is enveloped by a solution-vapor interface. There is a substantial thermal gradient across the plasma region. The temperature at the anode edge is more than 3000° C., while it is 100° C. at the solution-vapor interface. The loss of weight of the electrodes is due to the formation of carbon dioxide, carbon monoxide, carbon nanotubes (CNTs) and other carbonaceous materials including dislodged graphene sheets, carbon onions, amorphous carbon and carbon rods.

FIG. 7a shows the surface of an electrode prior to the arc discharge reaction. FIG. 7b shows the anode and FIG. 7c shows the cathode after arc discharge in water, respectively. The structure of the anode surface has significantly changed after the arc discharge. The morphology of the cathode surface is also uneven due to the deposition of the carbonaceous materials. FIG. 7d is an overall picture of the cathode and anode before arc discharge and FIG. 7e is an overall picture of both electrodes after arc discharge; the cathode increased in size, the anode decreased in size.

Figure 8:
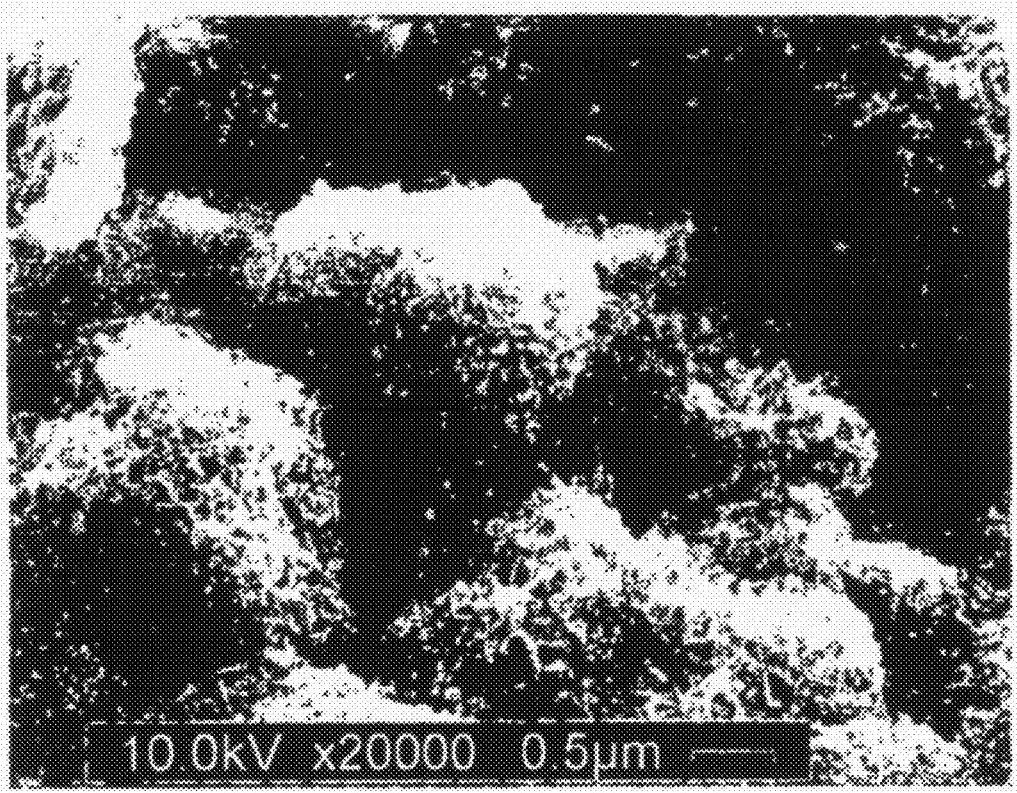
FIG. 8 is a scanning electron micrograph (SEM) of CNTs taken from the tip of the cathode.
Figure 9:
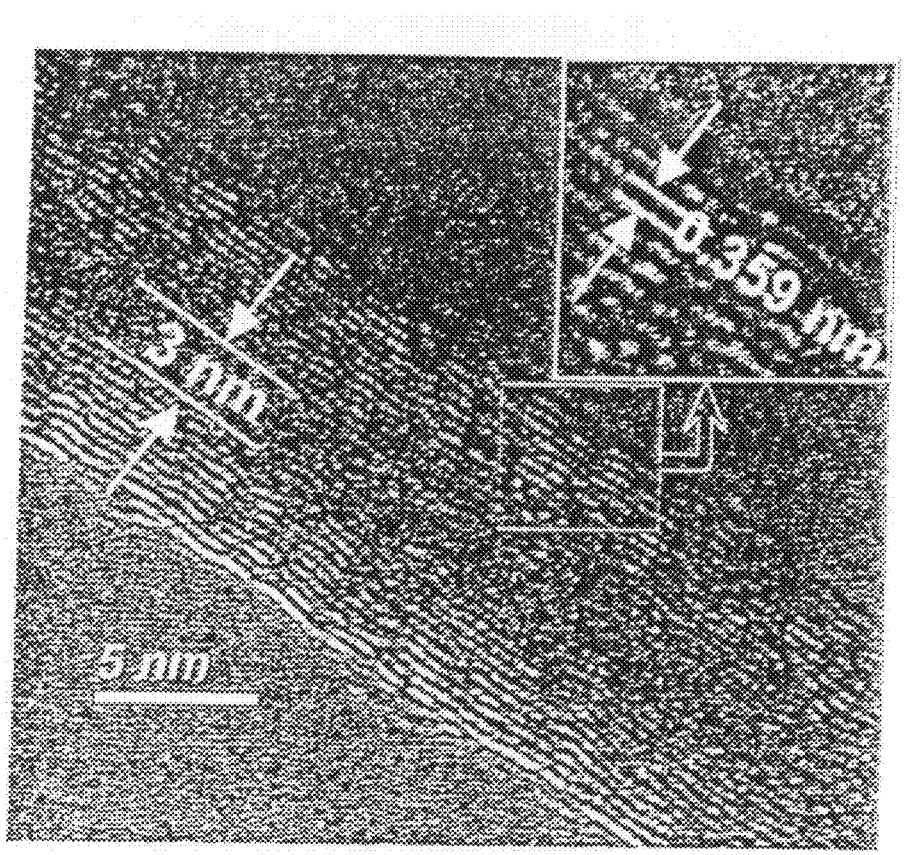
FIG. 9 is the high-resolution transmission electron microscopy (HRTEM) image of a CNT showing the inner and outer diameter.

Scanning electron micrograph (SEM) studies of the cathode materials reveals a deposition of CNTs. FIG. 8 shows a small mound of deposited CNTs. The inner and outer diameters of a CNT as shown in HRTEM micrograph of FIG. 9 are 3 nm and 10 nm, respectively. The inset picture, FIG. 9a, shows that the distance between the two concentric walls is 0.359 nm.

Figure 10:
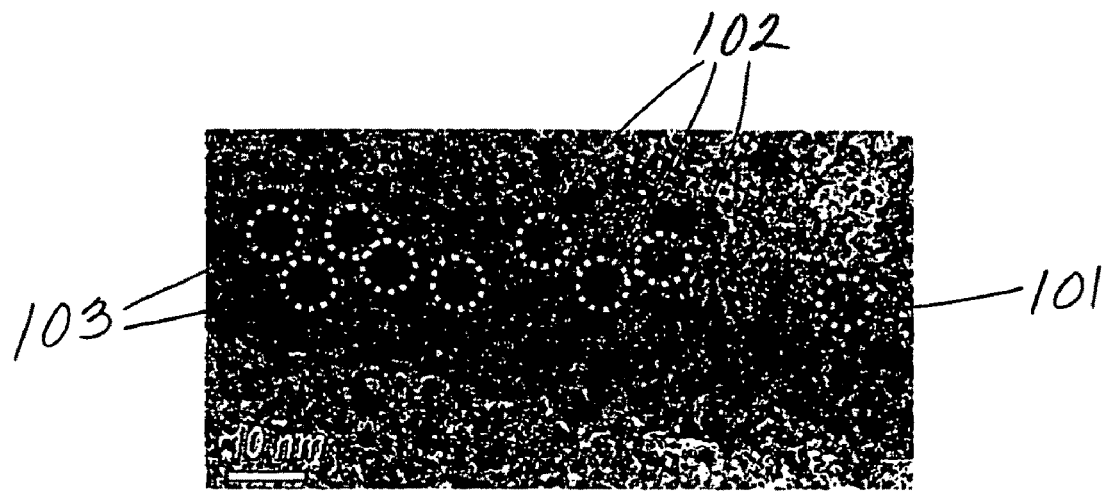
FIG. 10 is a transmission electron microscopy (TEM) bright-field image showing marked black spots that are palladium nanoparticles decorated around a CNT.

A transmission electron micrograph (TEM) bright-field image of a CNT decorated with palladium nanoparticles is shown in FIG. 10. The diameter of the CNT is approximately 15 nm. The spherical darker regions 101, 102, 103 in FIG. 10 correspond to the palladium nanoparticles of about 3 nm in diameter.

Figure 11:
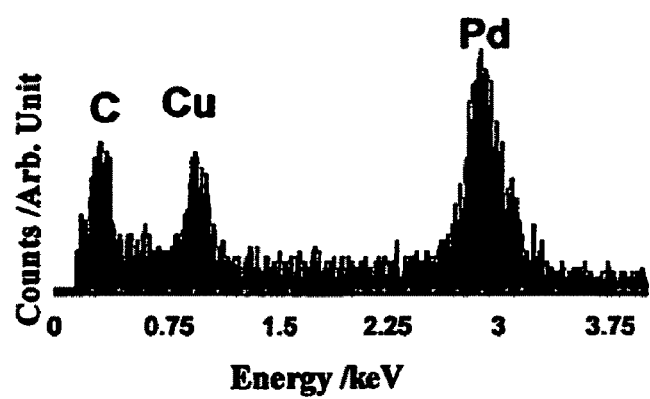
FIG. 11 is an energy dispersive spectroscopy (EDS) spectrum of CNT decorated with palladium collected from transmission electron microscopy (TEM) data.

The EDS spectrum in FIG. 11 is very similar to that in FIG. 1B and reveals the presence of carbon (C) and palladium (Pd). A copper (Cu) grid was used in the TEM study; hence a Cu peak is also observed in the spectrum. Again it is observed that the EDS spectrum does not show a chlorine peak which suggests that chlorine was not present either as palladium chloride inside the nanotubes or as atomic chlorine attached to the sidewall.

Figure 12:
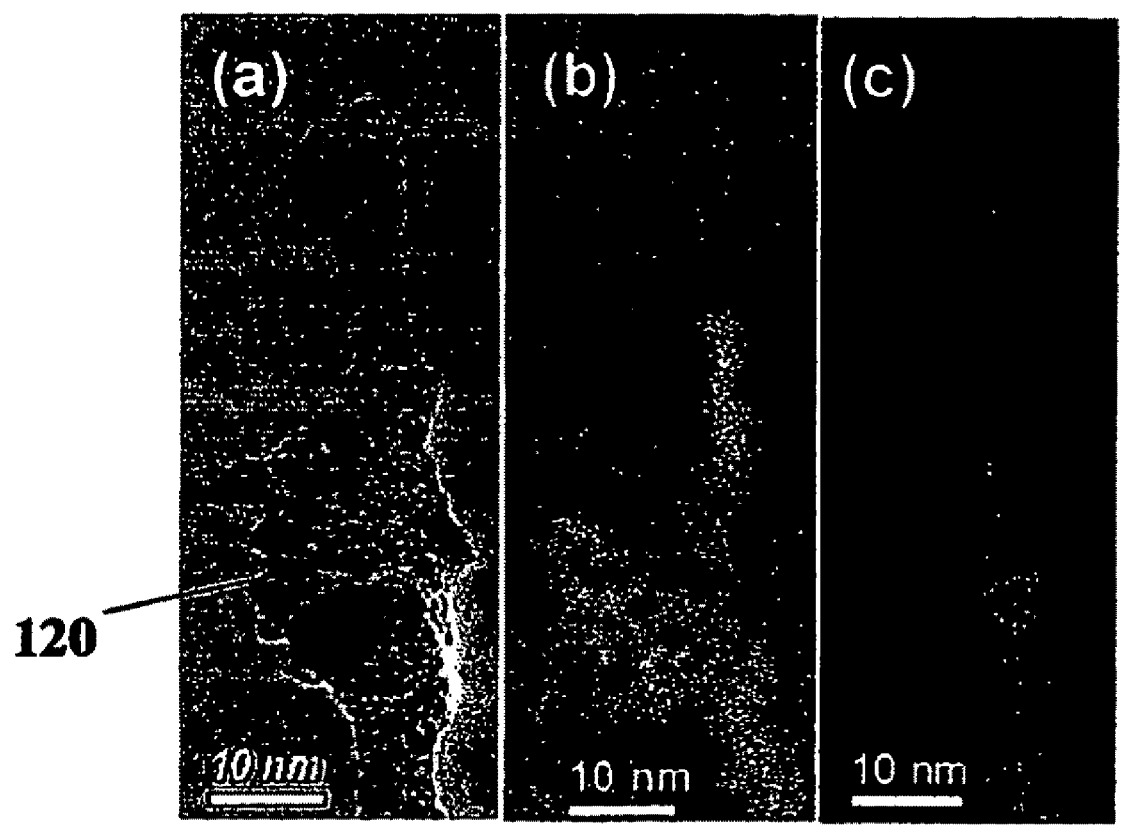
FIG. 12a is a zero-loss energy filtered transmission electron microscopy (TEM) image.
FIG. 12b is a transmission electron microscopy (TEM) energy-loss map of palladium.
FIG. 12c is a transmission electron microscopy (TEM) energy-loss map of carbon.

A zero-loss energy filtered image of a CNT decorated with palladium nanoparticles is shown in FIG. 12a. A dense agglomeration of palladium nanoparticles 120 in the center of the CNT can be observed. To confirm further, a carbon map and a palladium map have been collected using the Gatan imaging filter on the same portion of the CNT. The palladium map of the CNT is shown in FIG. 12b and the carbon map of the CNT is shown in FIG. 12c. FIG. 12b shows that the bulging area of the CNT is caused by the deposition of several palladium nanoparticles. The palladium map also reveals that the CNT is decorated with palladium nanoparticles, however, FIG. 12b does not clearly show that all nanoparticles are outside the CNT. HRTEM is used to investigate the actual position of the palladium nanoparticles.

Figure 13:
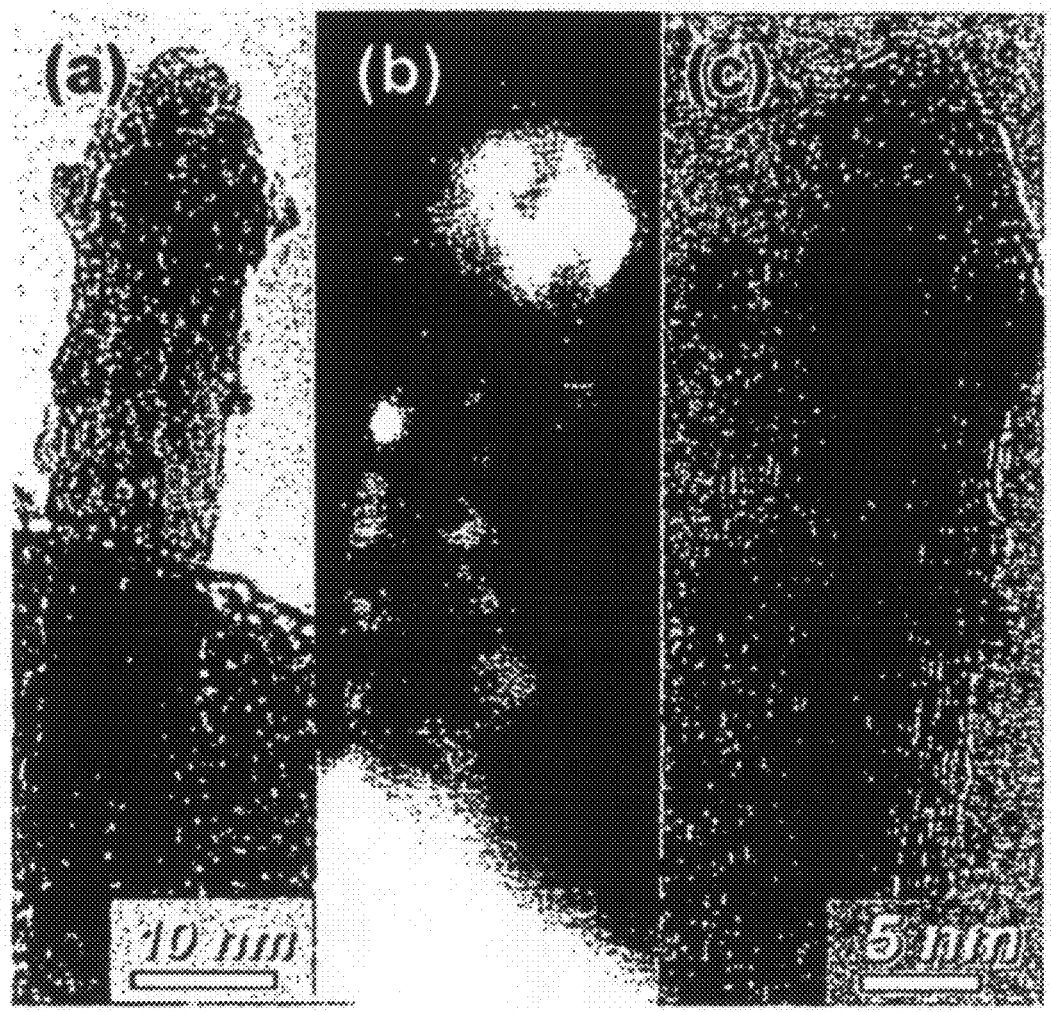
FIG. 13a is a high-resolution transmission electron microscopy (HRTEM) image of a CNT with palladium nanoparticles shown as black spots.
FIG. 13b is a scanning transmission electron microscopy (STEM) image of the same nanotubes in 13a wherein the palladium nanoparticles decorated around the nanotubes are shown as white spots.
FIG. 13c is a high-resolution transmission electron microscopy (HRTEM) image showing the lattice fringes of the CNT.

A CNT that is decorated by well-separated palladium nanoparticles is shown in FIG. 13a. HRTEM micrograph shows the lattice fringes of both the CNT and the palladium nanoparticles. FIG. 13b shows the same CNT as in FIG. 13a investigated with a scanning transmission electron microscopy (STEM) using a high-angle annular dark field detector for Z-contrast imaging. Because of the high atomic weight, palladium nanoparticles in FIG. 13b appear as bright spots. HRTEM micrograph in FIG. 13c shows the lattice fringes of the CNT.

Figure 14:
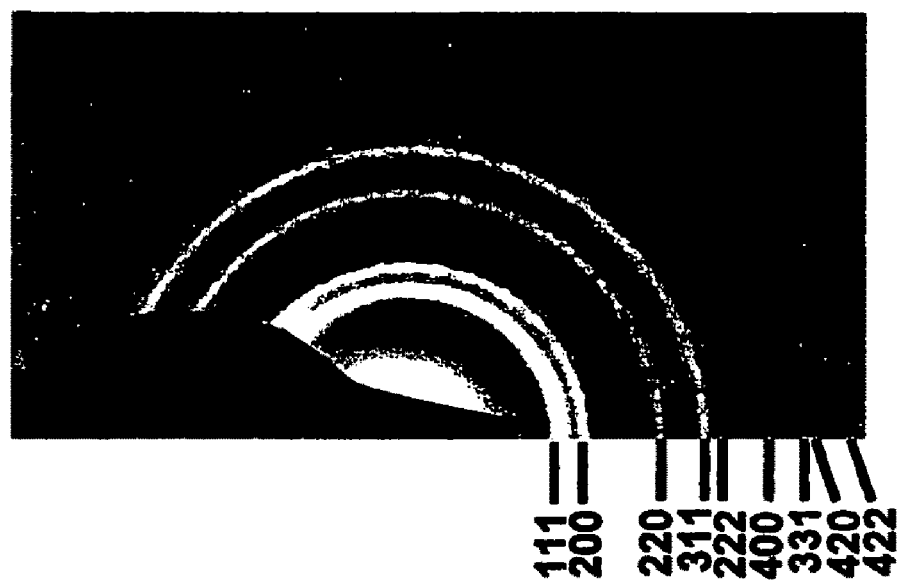
FIG. 14 is a Fourier filtered diffraction pattern of palladium nanoparticles on CNT.
Figure 15:
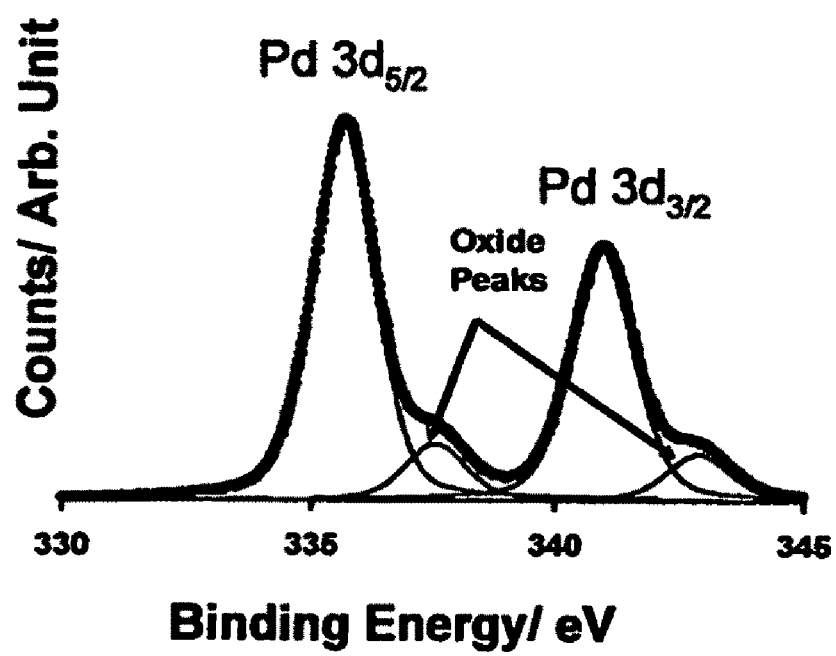
FIG. 15 is a deconvoluted X-ray photoelectron spectroscopy (XPS) envelope of the CNTs decorated with palladium nanoparticles.

In order to investigate the crystal structure of the palladium nanoparticles, selected-area diffraction patterns (SAED) were collected in the TEM mode. FIG. 14 shows a Fourier-filtered SAED pattern with nine distinct Debye-Scherrer rings compatible with a face-centered cubic crystal structure of the palladium particles. The de-convoluted X-ray photoelectron spectroscopy (XPS) spectrum with the Pd(3d) envelope is shown in FIG. 15 revealing the presence of Pd($3d_{5/2}$) and Pd($3d_{3/2}$) peaks at binding energy values of 335.6 and 340.9 eV, respectively. The presence of a small amount of palladium oxide has also been observed in the XPS envelope as shown in FIG. 15.

Figure 16:
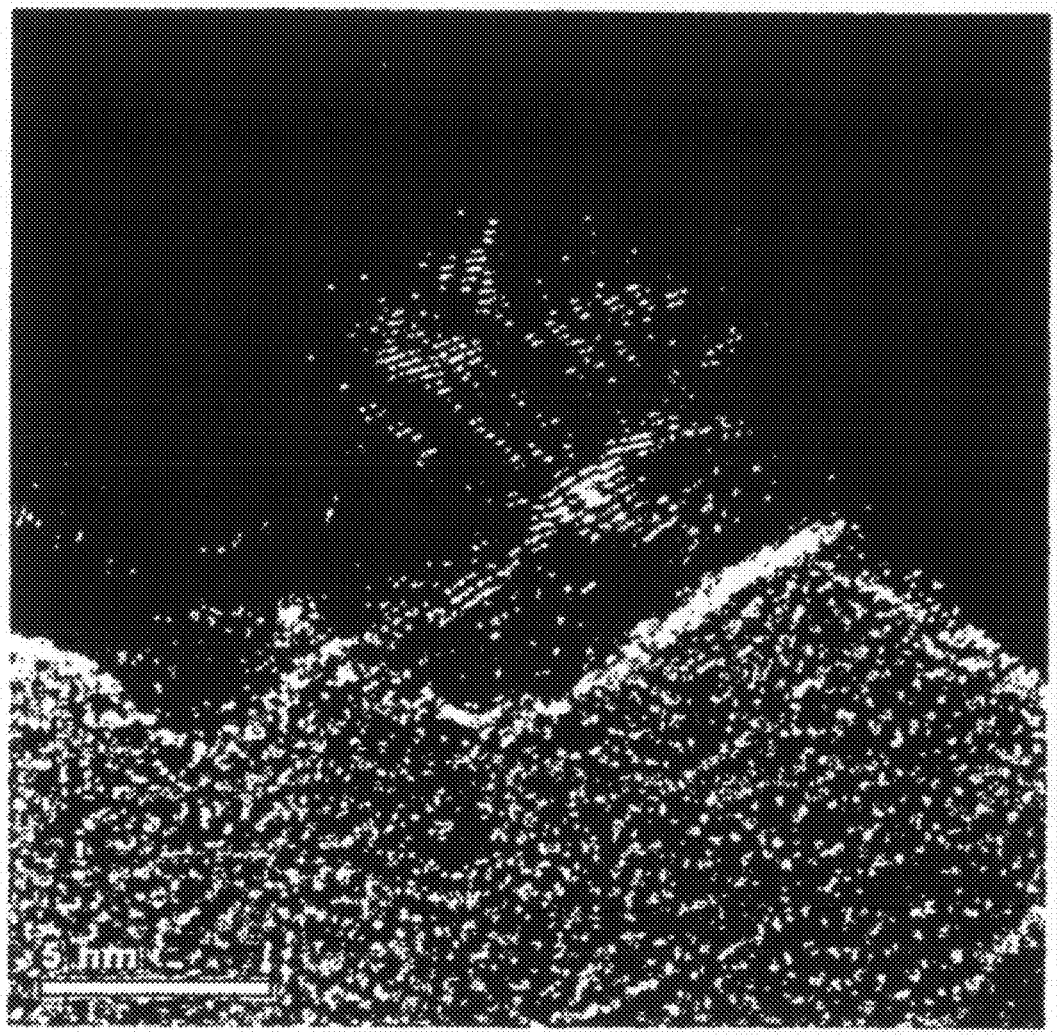
FIG. 16 is a transmission electron micrograph (TEM) of dislodged graphene sheets showing the wavy morphology.

The carbon nanotubes (CNTs) formed during the arc discharge in solution process were studied using transmission electron microscopy (TEM). It was observed that the original graphene sheets were partially rolled up leaving behind some bath tub-shaped portions, suggesting that rolling of graphitic layers from the anode materials formed the CNTs. In FIG. 16 the HRTEM micrograph shows a dislodged graphene sheet with a wavy surface morphology, which supports the scroll mechanism for the formation of CNTs.

Figure 17:
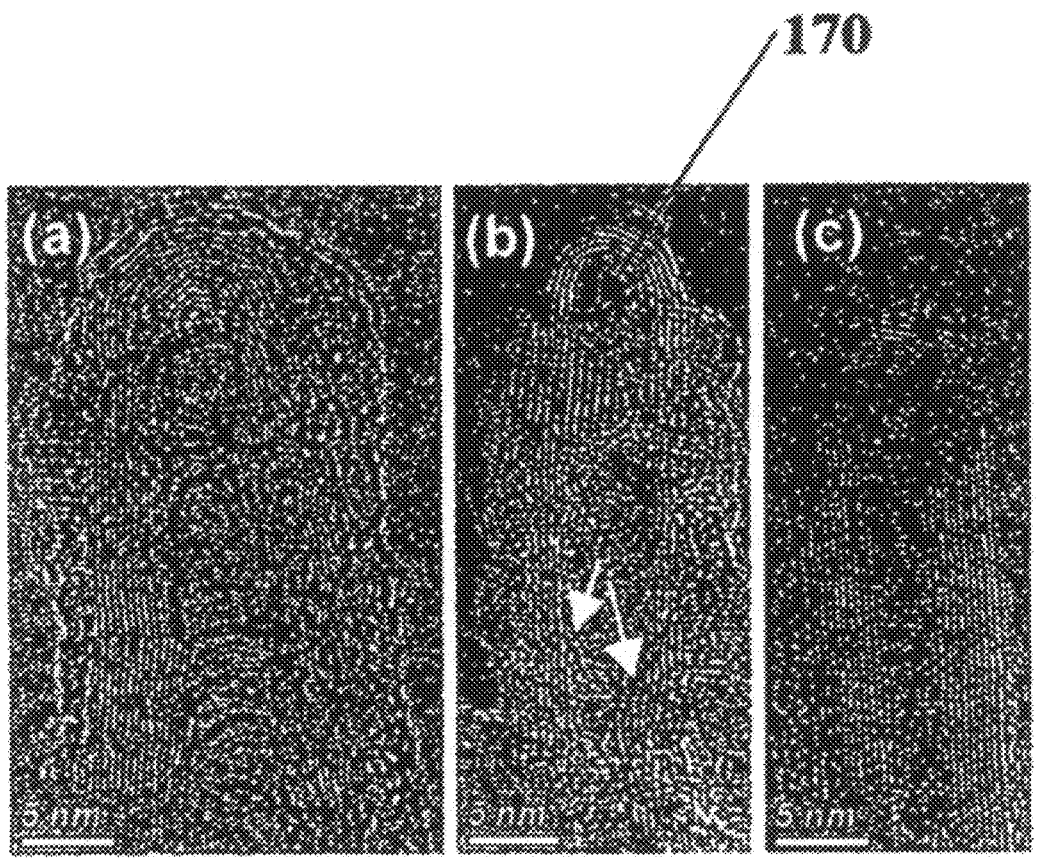
FIG. 17a is a transmission electron micrograph (TEM) revealing inner walls capped in a periodic manner and the same number of walls for both sides of a multi-walled CNT.
FIG. 17b is a transmission electron micrograph (TEM) revealing an unequal number of walls in two sides of a multi-walled CNT.
FIG. 17c is a transmission electron micrograph (TEM) revealing an equal number of walls for both sides of a multi-walled CNT.

The formation of multi-walled CNTs during the arc discharge in solution process is shown in FIGS. 17a, 17b, and 17c. FIG. 17a shows a HRTEM micrograph of a CNT with nested cylindrical graphitic layers. FIG. 17b shows different numbers of walls on the two sides of a CNT with a final closure by a single cap. FIG. 17b also reveals the presence of incomplete and bent layer at the inner concentric wall 170, as marked by arrows. Such defects could initiate the formation of an inner cap with time. The scroll mechanism can form a convoluted multi-walled CNT, which could eventually transform to a concentric multi-walled CNT by the rearrangement of carbon atoms. FIG. 17c shows the same numbers of walls in the two sides of a CNT, which may further support the scroll mechanism. Thus, the in-situ synthesis of Pd-nanoparticles decorated and encapsulated CNTs using arc-discharge in solution is applicable to both single-walled and multi-walled CNTs.

The present invention successfully synthesizes carbon nanotubes filled with metallic palladium nanoparticles by using a method of arc discharge in a solution containing palladium chloride. The diameters of nanotubes and the Pd-nanoparticles are measured as 15 nm and 3 nm, respectively. Such CNTs filled with palladium nanoparticles are "vessels" with enhanced capability for hydrogen storage.

There are many advantages to the process for simultaneously forming CNTs with Pd-nanoparticles, including, but not limited to, the simplicity of the entire process, the efficiency of the filling process, and the advancement of the entire field of nanotechnology.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method of preparing a composition of matter wherein carbon nanotubes are simultaneously formed and filled with metallic-nanoparticles prepared by in-situ arc discharge in solution comprising the steps of:
   a) selecting a cylindrical reactor cell consisting of
      i) a double walled glass with 2 cm thickness, on two sides of a cylindrical cell having an inner diameter of 10 cm, for flowing of cold water at 7° C. to cool the cell;
      ii) a cell cavity with a pair of inlets and a pair of outlets, wherein a first inlet is paired with a first outlet connected to the volume between the double glass walls for the flow of chilled water, and a second inlet is used for filling the cell with a solution for the arc-discharge reaction and is paired with a second outlet for filtering out the encapsulated and decorated carbon nanotubes formed in the cell;
      iii) a first stainless steel plate covering the top of the cylindrical reactor cell that connects to an anode and a second stainless steel plate covering the bottom of the cylindrical reactor cell that connects to a cathode; and
      iv) a direct current power supply system connecting to both the anode and the cathode that are immersed in the solution for the arc-discharge reaction;
   b) preparing a metallic compound solution comprising a metallic compound powder, de-ionized water, and hydrochloric acid in a container;
   c) using the second inlet to fill the cell cavity with the metallic compound solution;
   d) immersing a graphite electrode assembly, having two graphite electrodes, wherein the electrode assembly consists of one electrode acting as a cathode and another electrode acting as an anode, into the metallic compound solution;
   e) connecting the graphite electrodes to a direct current power supply;

f) bringing the electrodes into contact with each other to strike an arc and create an in-situ arc-discharge, wherein the temperature at the site of the arc-discharge is greater than 3000° C.;
g) vaporizing the metallic compound solution to leave a residue of a plurality of metallic-nanoparticles;
h) separating the electrodes to sustain the arc inside the solution;
i) forming graphene layers that roll away from the electrodes thereby forming graphitic carbon nanotubes that simultaneously encapsulate the metallic-nanoparticles;
j) flowing chilled water at a temperature of approximately 7° C. through the first inlet of the cell to facilitate cooling; and
k) collecting metallic-nanoparticles entrapped in carbon nanotubes.

2. The method of preparing a composition of matter in claim 1, wherein the metallic compound solution for the in-situ arc discharge reaction includes a solution selected from at least one of metallic chlorides, metallic oxides, metallic sulfides, metallic carbides and metallic nitrides, for synthesizing carbon nanotubes filled with metallic nanoparticles.

3. The method of preparing a composition of matter in claim 2, wherein the solution for the in-situ arc discharge reaction includes palladium chloride for synthesizing carbon nanotubes filled with palladium nanoparticles.

* * * * *